United States Patent
Schneider et al.

(10) Patent No.: US 11,646,129 B2
(45) Date of Patent: May 9, 2023

(54) HARNESS ASSEMBLY

(71) Applicant: Eaton Intelligent Power Limited, Dublin (IE)

(72) Inventors: Michael J. Schneider, Secane, PA (US); Sam Spiegel, Merion Station, PA (US); James H. Le, Philadelphia, PA (US); Ganesh R. Chavan, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/034,705

(22) Filed: Sep. 28, 2020

(65) Prior Publication Data

US 2021/0098150 A1    Apr. 1, 2021

(30) Foreign Application Priority Data

Sep. 30, 2019   (IN) .............................. 201911039581

(51) Int. Cl.
| | | |
|---|---|---|
| *H01B 7/00* | (2006.01) | |
| *H01B 7/18* | (2006.01) | |
| *H01B 7/22* | (2006.01) | |
| *B60R 16/02* | (2006.01) | |

(52) U.S. Cl.
CPC ......... *H01B 7/0045* (2013.01); *H01B 7/1875* (2013.01); *H01B 7/228* (2013.01); *B60R 16/0215* (2013.01)

(58) Field of Classification Search
CPC .......... H01R 13/6593; H01R 13/65912; H01R 13/6592; B60R 16/0207; H01B 7/228; H01B 7/1875; H01B 7/0045
See application file for complete search history.

(56) References Cited

U.S. PATENT DOCUMENTS

| | | | | |
|---|---|---|---|---|
| 2,939,905 | A * | 6/1960 | Canfield ................. | H01B 7/04 174/71 R |
| 4,026,628 | A | 5/1977 | Duffner et al. | |
| 4,804,338 | A * | 2/1989 | Dibble ..................... | H01R 4/72 29/859 |
| 4,921,449 | A * | 5/1990 | Fish ........................ | H01R 9/032 439/607.41 |
| 6,143,986 | A * | 11/2000 | Anderson .............. | H01R 9/038 174/72 A |
| 9,197,008 | B1 * | 11/2015 | Myong .................. | H01R 4/302 |
| 9,716,374 | B2 * | 7/2017 | Rohr ...................... | H01R 43/28 |
| 2013/0072055 | A1 * | 3/2013 | Pedruzzi ............... | H01R 9/032 439/470 |
| 2016/0100509 | A1 * | 4/2016 | Yanagihara ........... | H01R 9/034 174/350 |

FOREIGN PATENT DOCUMENTS

EP         2892109 A1     7/2015

OTHER PUBLICATIONS

Extended EP Search Report, EP 20199464.7, dated Feb. 23, 2021.

* cited by examiner

*Primary Examiner* — Hoa C Nguyen
*Assistant Examiner* — Amol H Patel
(74) *Attorney, Agent, or Firm* — Merchant & Gould P.C.

(57) ABSTRACT

A harness assembly may include a cable having a cable shielding around at least a portion of a plurality of wires, a connector with an integrated backshell arranged at an angle with respect to the cable, an external braid disposed around at least a portion of the backshell and the cable, and an overbraid around at least a portion of the external braid, the overbraid having two layers.

17 Claims, 5 Drawing Sheets

HARNESS ASSEMBLY

CROSS-REFERENCE TO RELATED APPLICATIONS

This application claims the benefit of India Provisional Patent Application Ser. No. 201911039581, filed on Sep. 30, 2019, the disclosure of which is hereby incorporated herein by reference in its entirety.

TECHNICAL FIELD

The present disclosure generally relates to a harness assembly, such as for connecting sensors with another component, including harness assemblies that may be used in connection with engines, such as in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Cables and lead wires can act as unintended antennas to both receive and to radiate an electromagnetic interference (EMI) signal. As such, shields are often incorporated in cable designs as additional conductors added to the cables or wires to help isolate the electromagnetic fields of conductors within the shield from those outside of the shield. Such cable designs may be used, for example, in harness assemblies for connecting sensors, such as a quantitative debris monitoring (QDM) sensor of a vehicle engine's oil debris monitoring system (ODMS), to another component, such as a signal conditioner unit (SCU) in the vehicle. Considerations that go into the cable designs include, but are not limited to, pull strength, strain relief, EMI protection, repairability, environmental sealing, environmental compatibility, ease of manufacturing, and weight.

There is a desire for solutions/options that minimize or eliminate one or more challenges or shortcomings of cable designs, particularly in to harness assemblies, with respect to one or more of these considerations. The foregoing discussion is intended only to illustrate examples of the present field and should not be taken as a disavowal of scope.

SUMMARY

In embodiments, a harness assembly may include a cable having a cable shielding around at least a portion of a plurality of wires, a connector with an integrated backshell arranged at an angle with respect to the cable, an external braid disposed around at least a portion of the backshell and the cable, and an overbraid around at least a portion of the external braid, the overbraid having two layers.

In embodiments, a method for assembling a harness assembly may include arranging a cable and a connector with an integrated backshell at an angle with respect to one another, providing an external braid around at least a portion of the backshell and an end of the cable adjacent to the connector, and providing an overbraid around at least a portion of the external braid, the overbraid having two layers.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
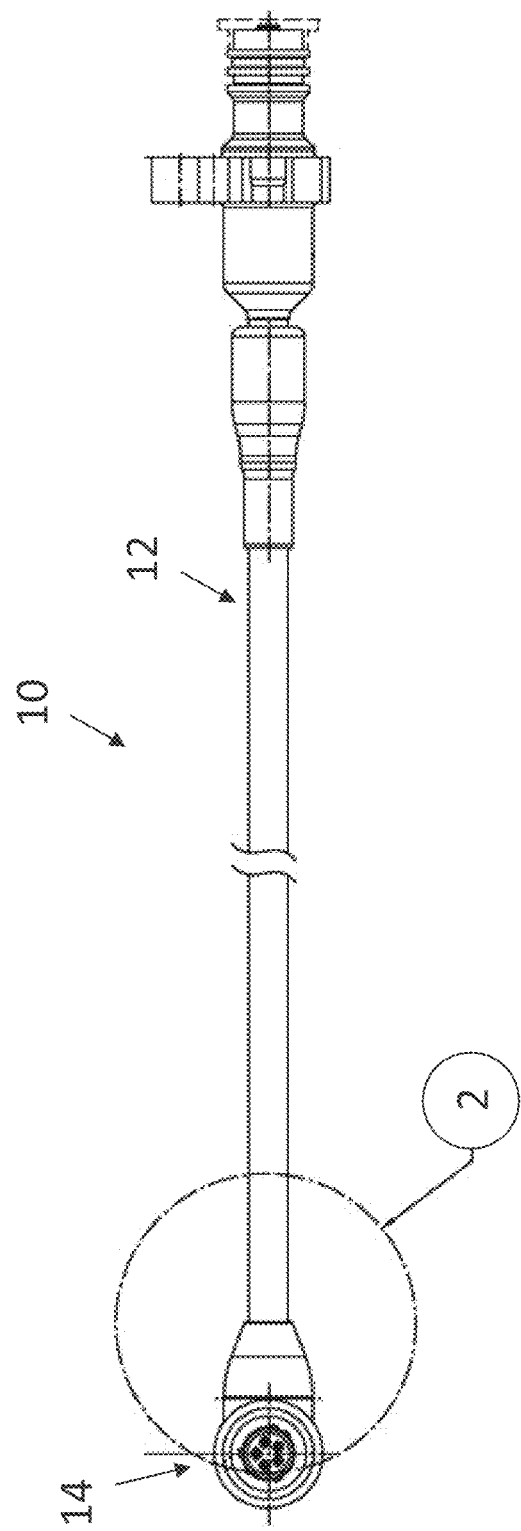
FIG. 1 is a top view generally illustrating an embodiment of a harness assembly according to teachings of the present disclosure.
Figure 2:
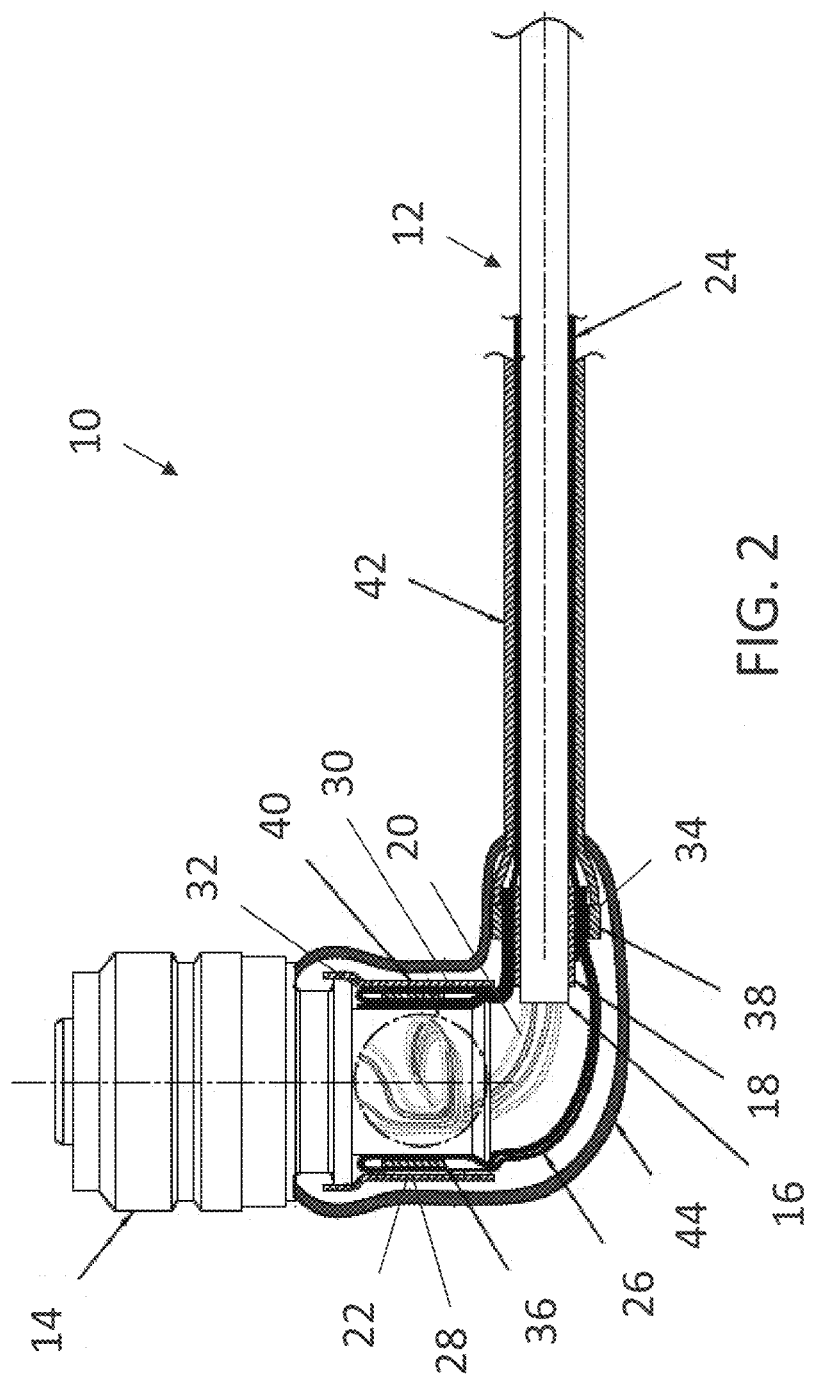
FIG. 2 is a cross-sectional view generally illustrating an embodiment of a connector of a harness assembly according to teachings of the present disclosure.

In embodiments, such as generally illustrated in FIGS. 1 and 2, a harness assembly 10 may include a cable 12 and a connector 14 arranged adjacent a first end of the cable 12. The connector 14 may be arranged at an angle with respect to the cable 12, which may be varied based upon a particular required cable configuration. Without limitation, in embodiments, the angle may be approximately 90 degrees. In other embodiments, the angle may be approximately 45 degrees. The cable 12 may include a cable shielding 16 through which wires 20 extend, and the cable shielding may terminate at or within the connector 14. An opposing end of the cable 12 may be configured for attachment and/or connection to a sensor, such as, for example and without limitation, a quantitative debris monitoring (QDM) sensor of a vehicle engine's oil debris monitoring system (ODMS). The connector 14 may generally be configured for attachment and/or connection to another component, such as a signal conditioning unit (SCU) of the vehicle. A Teflon tubing 18 may be provided at or around a first end of the cable 12.

With embodiments, the connector 14 may be, for example, an EN2997 connector, and may include an integrated backshell 22, such as generally illustrated in FIG. 2. The harness assembly 10 may include an external braid 24 disposed around at least a portion of the backshell 22 and around the first end of the cable 12, which may include the Teflon tubing 18.

In embodiments, the harness assembly 10 may further include an overbraid 26 disposed around at least a portion of the external braid 24. The overbraid 26 may include a first layer 28 and a second layer 30. In embodiments, the overbraid 26 may be made from a single material that is folded over at least a portion of itself to form the layers 28, 30. In such a configuration, the folded end 32 may be in a region of the backshell 22 and a free end 34 of the overbraid 26 may be in a region of the first end of the cable 12. However, it should be appreciated that the folded end 32 and the free end 34 may be switched. The double layer configuration of the overbraid 26 may reduce the size of potential gaps in the braid, thereby enhancing the shielding effectiveness against electromagnetic interference. Such a configuration further may, inter alia, reduce weight and/or cost.

With embodiments, the external braid 24 and/or the overbraid 26 may be comprised of copper and/or may be nickel-plated.

In embodiments, the external braid 24 and the first layer 28 of the overbraid 26 may be connected or secured to the backshell 22, for example, via a band 36. The second layer 30 of the overbraid 26 may be disposed around the band 36. Where the overbraid 26 is comprised of a single material folded over itself, the single material may be folded over the band 36. The free end 34 of the overbraid 26 may be secured to the cable 12, for example, via a cable tie 38.

With embodiments, the harness assembly 10 may include shrink tubing 40 around at least a portion of the overbraid 26 in a region of the backshell 22 and/or shrink tubing 42 around at least a portion of the overbraid 26 in a region of the first end of the cable 12 and/or around at least portion of the cable 12. The harness assembly 10 may further include a heat shrink boot 44 from the connector 14 to the cable 12. The heat shrink boot 44 generally may have an angled configuration at a same or similar angle at which the cable 12 and the connector 14 are arranged with respect to each other, e.g., 45 degrees or 90 degrees. The shrink tubing 40, 42 and/or the heat shrink boot 44 may be made of a fluoroelastomer material, and further may be bonded via a compatible epoxy. The shrink tubing 40, 42 and/or the heat shrink boot 44 generally may provide for environmental protection and/or sealing. A service loop in the wires 20 may be accessible by cutting back the shrink boot 44.

Figure 3:
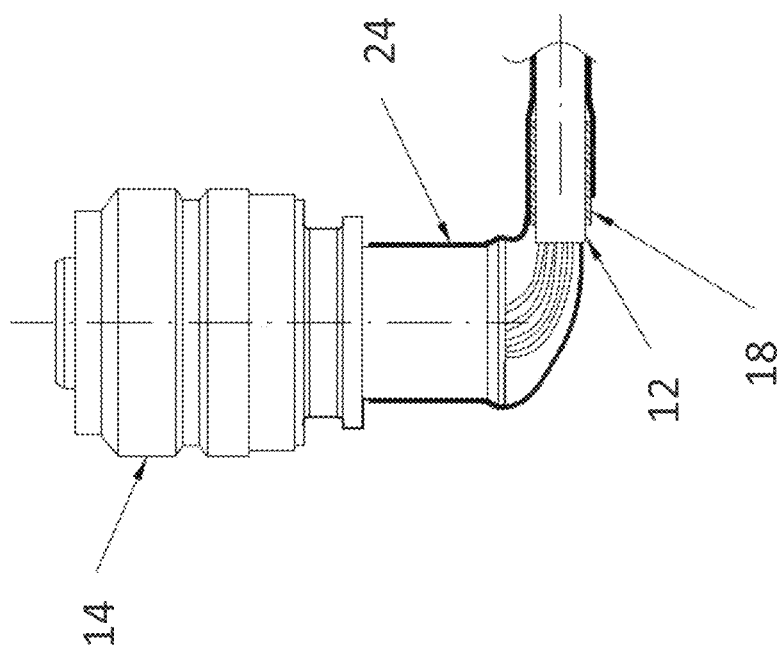
FIGS. 3-5 are cross-sectional views generally illustrating an embodiment of a method for assembling a harness assembly with a connector according to teachings of the present disclosure.
Figure 4:
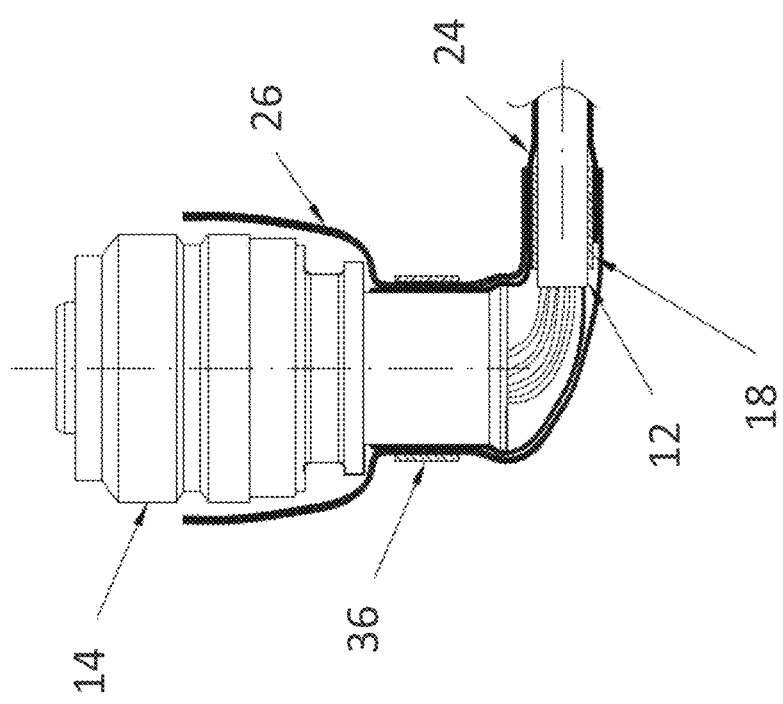
Figure 5:
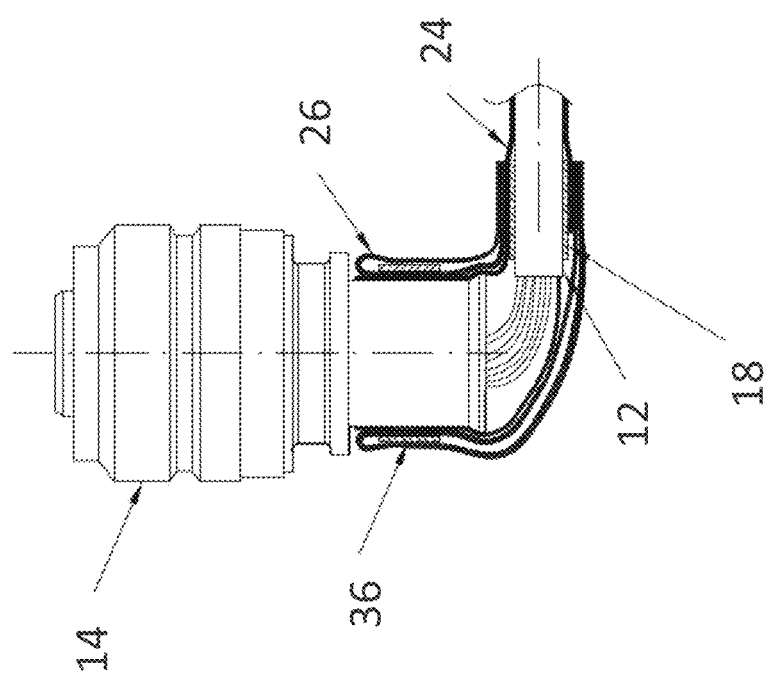

With embodiments generally illustrated in FIGS. 3-5, a method for assembling a harness assembly 10 may include arranging a cable 12 and a connector 14 at an angle with respect to one another. The method may include providing an external braid 24 around at least a portion of a backshell 22 integrated with the connector 14 and around a first end of the cable 12 adjacent to the connector 14.

In embodiments, the method may include feeding the wires 20 through a wall of the external braid 24 prior to termination. This may allow the external braid 24 to be installed as a flat braid on one side of the backshell 22 (e.g., the side facing the cable 12). Commonly, to achieve a full or significant effect of the strain relief capabilities, the external braid 24 generally should not stretch significantly in a direction that is not axial to the braid 24 to avoid over-stretching. When stretched, the flat braid may hold more strength than a stretched braid around the circular backshell 22, thereby better ensuring that strain relief may be achieved and/or avoiding over-stretching of the braid.

With embodiments, the method may include providing an overbraid 26 around at least a portion of the external braid 24, where the overbraid 26 may have two layers 28 and 30. The two layers 28 and 30 may be formed by providing a single material of the overbraid 26 having extra length, such as generally shown in FIG. 4, and folding the single material over at least a portion of itself, such as generally shown in FIG. 5.

In embodiments, the method may also include securing the single material of the overbraid 26 to the external braid 24 in a region of the connector 14, for example, via a band 36, where the single material may be folded over the band 36. The method may further include securing a free end 34 of the overbraid 26 opposite a folded end 32 to the external braid 24 in a region of the first end of the cable 12.

With embodiments, the method may further include providing a shrink tubing 40 around at least a portion of the overbraid 26 in a region of the backshell 22 and/or shrink tubing 42 around at least a portion of the overbraid 26 in a region of the first end of the cable 12 and/or around at least portion of the cable 12 and/or providing a heat shrink boot 44 from the connector 14 to the cable 12. The shrink tubing 40, 42 and/or the heat shrink boot 44 may be bonded via a compatible epoxy.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A harness assembly, comprising:
   a cable having a cable shielding around at least a portion of a plurality of wires;
   a connector with an integrated backshell arranged at an angle with respect to the cable;
   an external braid disposed around at least a portion of the backshell and the cable;
   an overbraid around at least a portion of the external braid, the overbraid having two layers; and
   a polymeric tubing disposed at an end of the cable between the cable shielding and the external braid.

2. The harness assembly of claim 1, wherein the angle is approximately 90 degrees.

3. The harness assembly of claim 1, wherein the angle is approximately 45 degrees.

4. The harness assembly of claim 1, further comprising a band disposed around a first of the two layers of the overbraid, a second of the two layers of the overbraid being disposed around the band.

5. The harness assembly of claim 1, wherein the overbraid is a single material folded over at least a portion of itself to form the two layers.

6. The harness assembly of claim 1, wherein the overbraid is nickel-plated.

7. The harness assembly of claim 1, further comprising shrink tubing over at least a portion of the overbraid in a region of the backshell.

8. The harness assembly of claim 1, further comprising a cable tie around at least a portion of the overbraid in a region of an end of the cable.

9. The harness assembly of claim 1, wherein at least a portion of the external braid is configured as a flat braid.

10. The harness assembly of claim 1, wherein the polymeric tubing is a polytetrafluoroethylene tubing.

11. A method for assembling a harness assembly, comprising:
    arranging a cable and a connector with an integrated backshell at an angle with respect to one another;
    providing an external braid around at least a portion of the backshell and an end of the cable adjacent to the connector;
    providing an overbraid around at least a portion of the external braid, the overbraid having two layers;
    wherein providing the overbraid includes applying a single material of the overbraid over the at least a portion of the external braid, and folding the single material over at least a portion of itself to form the two layers; and
    securing the single material of the overbraid to the at least a portion of the external braid in a region of the connector via a band, wherein the single material is folded over the band.

12. The method of claim 11, further comprising feeding the cable through a wall of the external braid prior to termination.

13. The method of claim 11, further comprising securing an end of the overbraid opposite a folded end of the overbraid to the at least a portion of the external braid in a region of the end of the cable adjacent to the connector.

14. The method of claim 11, wherein the angle is approximately 90 degrees.

15. The method of claim 11, wherein the angle is approximately 45 degrees.

16. A connector for a harness assembly, comprising:
    a backshell;
    an external braid disposed around at least a portion of the backshell; and
    an overbraid having a single material around at least a portion of the external braid, the single material of the overbraid being folded over at least a portion of itself to form two layers; wherein the single material of the overbraid is secured to the at least a portion of the external braid in a region of the connector via a band, wherein the single material is folded over the band.

17. A harness assembly, comprising:
    a cable and a connector with an integrated backshell at an angle with respect to one another;
    an external braid around at least a portion of the backshell and an end of the cable adjacent to the connector; and
    an overbraid having a single material around at least a portion of the external braid;
    wherein the single material is folded over at least a portion of itself to form two layers; and
    wherein the single material is secured to the at least a portion of the external braid in a region of the connector via a band, and wherein the single material is folded over the band.

* * * * *